Oct. 7, 1958
C. F. FRAGOLA
2,855,558
AZIMUTH REFERENCE FOR HIGH LATITUDES
Filed Dec. 31, 1953
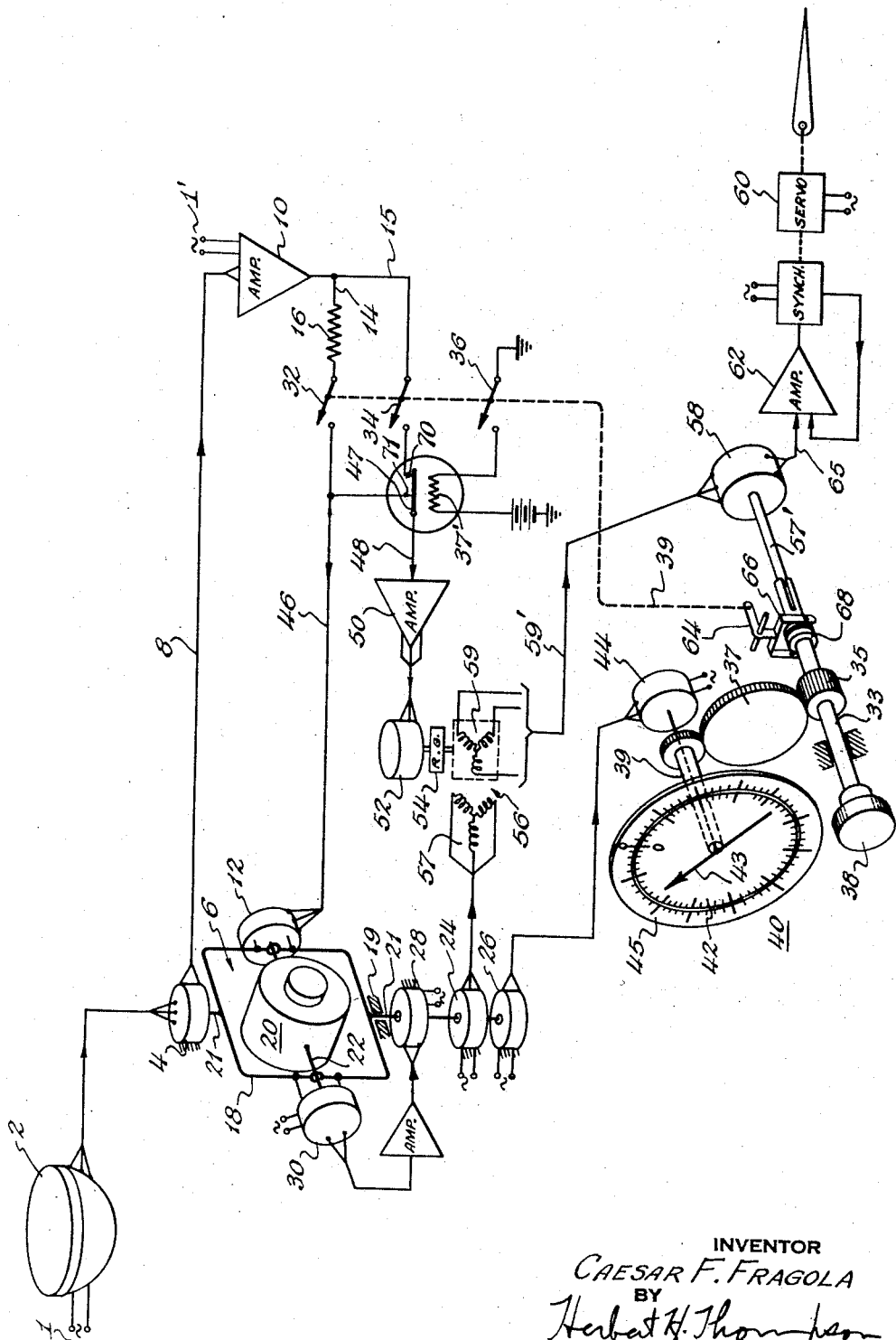
INVENTOR
CAESAR F. FRAGOLA
BY
Herbert H. Thompson
his ATTORNEY.

United States Patent Office 2,855,558
Patented Oct. 7, 1958

2,855,558

AZIMUTH REFERENCE FOR HIGH LATITUDES

Caesar F. Fragola, Uniondale, N. Y., assignor to Sperry Rand Corporation, a corporation of Delaware Application December 31, 1953, Serial No. 401,687

9 Claims. (Cl. 318—489)

This invention relates to improvements in aircraft automatic pilot navigation in high latitudes. The gyro-magnetic compass has now become the standard direction maintaining device for aircraft automatic pilots, but such device becomes unsatisfactory in high latitudes because of vagaries of the earth's magnetic field in these regions. The fundamentals of a standard gyro-magnetic system is outlined in the prior patent to Esval and Frische, No. 2,539,411, dated January 3, 1951, for Automatic Pilot, in which directional gyro is corrected from a flux valve type of magnetic compass by being slaved thereto.

It has been proposed, therefore, to abandon the magnetic slaving or other magnetic compass control of the directional gyro in high latitudes, thus using the same as a free directional gyroscope. One method of accomplishing this purpose is outlined in the copending application of Spencer Kellogg II, Serial No. 141,439, for Azimuth Data Providing Systems for Dirigible Craft, filed January 31, 1950, now U. S. Patent 2,699,612. To apply this idea to a standard aircraft automatic pilot of the gyromagnetic type, all that is necessary is to sever the slaving circuit between the flux valve and the slaved directional gyroscope at high latitudes, but such a device would provide no means for transition from one basis of control to the other without causing in some cases excessive transients or undesired turning of the craft. Assume for instance that the craft had been in flight for some time free of magnetic control, that is, on a "grid" course, possibly a great circle course using the free directional gyroscope as a base, after setting the course with reference to the Greenwich meridian. The patent to Esval and Wrigley, No. 2,555,328, dated June 5, 1951, for Great Circle Direction-Keeping Instrument, explains the simplicity of great circle navigation using a free directional gyroscope. Now suppose the craft enters a region where magnetic control may be resumed. During this time, the gyroscope will usually have wandered from its original position on the magnetic meridian, and in any event, the position of the magnetic meridian may have substantially changed in the meantime because of the new geographical location of the craft. If the magnetic slaving of the directional gyroscope were suddenly resumed, the resulting slaving torque about the horizontal axis of the gyroscope would cause it to precess at the standard rate of about 3° a minute until the gyro was aligned with the magnetic meridian. At the same time, however, the automatic pilot which obeys the course signals from the directional gyroscope would likewise execute a turn off course at the rate of 3° a minute, which is not only unnecessary but objectionable.

One of the purposes of the present invention is to avoid such objectionable turning of the craft off course during the time that the slave gyroscope is being brought back to the magnetic meridian.

Another object is to simplify the gyro-magnetic compass for use in high latitudes so as to simplify the system shown in the aforesaid application of Spencer Kellogg II by using a standard or commercial form of gyro-magnetic compass instead of the indirect method employed in said application.

Still other objects of the invention will be apparent from the following description.

Referring to the drawings, the single figure is a wiring diagram of one form of my invention showing the physical elements in diagrammatic form.

The magnetic compass is shown in the form of a flux valve 2 powered from a single phase source 1, the polyphase output of which is compared to that of synchro generator 4 on the directional or slave gyroscope 6 by which a single phase error signal is generated and transmitted through lead 8, as outlined in the aforesaid Esval and Frische patent. This is amplified by amplifier 10 powered by a source 1' having double the frequency of source 1 and applied to the slaving torquer 12 on the gyro through lead 14. A resistor 16 is shown in this lead to limit the current normally supplied to the torquer so that gyro will be precessed at a slow uniform rate, usually 3° a minute, when it is off the magnetic meridian. The gyro 6 is shown as a typical slaved directional gyroscope having a vertical ring 18 mounted for rotation about a vertical axis 21 on trunnions 19 and a rotor casing 20 journalled within the vertical ring about a horizontal trunnion 22. Rotated from the vertical shaft 21 are the armatures of the following synchros:

(1) Synchro signal generator 4, above described.
(2) The synchro 24 for controlling the automatic pilot.
(3) The synchro 26 which acts as a transmitter of compass heading.

Also driven from shaft 21 is the armature of the erection torquer 28 which is excited from a suitable pick-off 30 secured to the horizontal trunnion 22 and vertical ring 18 of the gyroscope.

A group of jointly operated switches 32, 34 and 36 is provided for transferring from magnetic slaving or gyromagnetic operation to free directional gyro operation and vice versa. Preferably, all such switches are operated by pulling in and out the knob 38 adjacent the repeater or navigator's compass 40.

To transmit longitudinal motion from the sleeve 33 to the switches 32, 34 and 36, I have shown a bell crank lever 64 having a fork 66 provided with inwardly extending pins to engage the grooved collar 68 on the shaft 33 so that when the handle 38 is pulled in and out, the bell crank is rotated and the switches closed or opened through intermediate linkage 39, but the shaft may be rotated by knob 38 without affecting the bell crank. Rotation of the shaft 33 is transmitted to a synchro generator 58 (hereinafter described) through the shaft 57' which has a pin and slot connection with the sleeve 33.

With the switches 32, 34 and 36 in the position shown in Fig. 1, the gyroscope is unslaved and therefore operates as a free gyro in which would be the position for high latitudes or regions of magnetic unreliability. When, however, it is desired to resume gyro-magnetic operation, the knob 38 is pulled outwardly to close this group of switches. The closing of the switch 32, it will be seen, will at once connect the lead 14 and resistor 16 to the lead 46, thus supplying exciting current or signal to the torquer 12 if the gyro is not aligned with the meridian, thereby precessing the gyro at the rate of 3° a minute into alignment. The closing of the switch 34 will likewise supply said aligning signal through an extension 15 of lead 14 to a circuit which accomplishes the purpose of preventing the aircraft from being otherwise turned at this time through the signal emanating from the synchro generator 24 on the gyro. With switch 34 closed, a current (preferably greater than that in lead 46) will be applied through normally closed contacts 70 and 71 of thermal snap switch 47 and lead 48 to amplifier 50 and a synchronizing motor 52, since thermostatic switch 47 is normally biased to the closed position. The increased current is likewise supplied to lead 46 connected with the slaving torquer 12 to bypass resistor 16 so that the torque exerted by the slaving torquer is increased at this time to greater than its normal strength, for instance, it is increased so that the rate of precession is increased from 3° a minute to, say, 180° a minute.

The shaft of the motor 52 is connected preferably through reduction gearing 54 to the armature of a differential synchro device 56 having two three-phase windings, one 57 being electrically connected to a similar winding in the synchro 24. The other three-phase winding 59 of the synchro 56 is connected to a similar winding on the synchro generator 58, the output of which operates the rudder servomotor 60 through amplifier 62. The circuits are such that the motor 52 will turn the rotor of synchro 56 in the opposite direction but at the same rate as the slaved gyro 6 is precessing, which rate is the same as the electrical rotation of the vectors in winding 57.

At this time also, the switch 36 closes a circuit through a heating coil 37' adjacent switch 47. The switch 47 is of the bimetallic thermostatic type so that after a predetermined interval the heat from coil 37' causes it to snap open, thus breaking the circuit in lead 15 thereby stopping the synchronizing motor 52 and reducing the voltage supplied to the slaving torquer to that normally supplied through the switch 32 and resistor 16.

Therefore, when resuming gyro magnetic operation after a period of free gyro operation, the gyro is first slaved to the magnetic compass with an increased torque causing it to precess, say, at the fast rate of 180° a minute. At the same time, the synchronizing motor turns one winding of the differential selsyn at the same rate but in the opposite direction with respect to the electrical vector rotation in the other winding which is produced by the synchro 24 on the shaft of the gyroscope 6. Therefore, there will be no signal produced in output lead 59' and therefore no signal will appear in lead 65 from the synchro generator 58 which controls the rudder servo 60 and the rudder will not be deflected. After a period of a minute in the example given, thermostatic switch 47 is pulled open, upon which event normal slaving is reinstated while the synchronizing motor is stopped. Therefore, from that point on, the gyroscope will be slaved to the magnetic meridian and signals from the synchro 24 will cause an error signal to appear in lead 65 in case the airplane is not on the course called for by the directional gyro.

Knob 38 may also be used to change course and to set it with reference to the course indicator 42. For this purpose, shaft 33 of said knob is shown as connected through pinion 35 and gearing 37 to sleeve 39 which carries the rotatable course indicator card 42. The magnetic heading is indicated by the reading of the pointer 43 on the shaft of the repeater motor 44 with respect to a fixed dial 45 and course changes may be set on card 42. Course change is effected by turning knob 38 to rotate synchro 58 so that a turn signal is sent to the rudder by displacement of the rotor of the synchro generator 58. By turning the knob to displace card 42 through the desired number of degrees, say 90°, the craft will be caused to turn through the same number of degrees through the automatic pilot in a manner similar to the course change knob 10 in the prior patent to Frische et al. No. 2,415,430, dated February 11, 1947, for Automatic Pilot With Automatic Banking.

It is understood that in the foregoing description I have broadly outlined how my invention may be applied to a gyro-magnetic type of automatic pilot for aircraft so that the magnetic compass may be severed from the control and again reestablished without causing unwanted course deviations during or following the transfer. No attempt has been made to show the automatic pilot in detail, which is usually equipped with means by which automatic banking is secured during turns, one example being shown in the aforesaid Frische et al. Patent No. 2,415,430. It should also be understood that my invention may be applied to any type of automatic pilot in which the magnetic compass may be either employed as an azimuth reference or not, at will, but in which a free directional gyroscope is employed when the magnetic compass is not used as such reference. For example, if my invention were applied to an automatic pilot having a gyro-magnetic reference such as shown in the aforesaid application of Spencer Kellogg II, this could readily be accomplished by placing between the final directional transmitter 56 (of Kellogg) and the auto pilot synchro a differential synchro similar to that shown at 56 herein, or that shown at 22 in Kellogg, and in which the rotor of said differential synchro would be turned from shaft 28 of Kellogg. In that case, the extra motor 52 of my application could be omitted entirely, since the shaft 28 is turned at the same slow speed at which the indicator 42 is being corrected.

In my invention, when the shift is being made from a magnetic slaving or control to free gyro operation, all that need be done is to open the switches 32, 34 and 36 by pushing in the handle 38, since in that case no further correction is necessary because the gyro will then be operating as a free directional gyroscope and will remain in the position it is at the time of release from a magnetic slaving.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Thus, my invention is not necessarily limited to high latitude gyro-magnetic compasses, but is equally applicable to any combined gyro and magnetic reference for automatic pilots wherein it may be desirable to temporarily sever the correction or slaving of the gyroscope from the magnetic compass for any cause. Thus, gyromagnetic systems are known in which the slaving of the gyroscope is interrupted during turns of the craft. See, for instance, the patent to Bates No. 2,066,194, dated December 29, 1936. Obviously, my invention is equally applicable to such a system in which my switches 32, 34 and 36 or their equivalent would be operated manually upon turns, or from the turn control of the automatic pilot or from any turn responsive device.

What is claimed is:

1. In an automatic pilot for aircraft having a gyromagnetic compass including a directional gyroscope normally corrected from a magnetic compass as the normal azimuth reference device for said automatic pilot, means whereby said directional gyroscope may be freed at will from control by the magnetic compass and again brought under control thereof, means for preventing said automatic pilot from causing course changes upon reestablishment of the magnetic compass control of said gyroscope comprising a differential device between the directional gyroscope and automatic pilot, and means brought into action by such reestablishment for rotating said device at the same speed that the gyroscope is corrected from the magnetic compass.

2. A gyro-magnetic automatic pilot for aircraft as claimed in claim 1, having means for correcting the directional gyroscope at a greater than normal rate for the period during which synchronism is taking place after reestablishment of magnetic control.

3. In an automatic pilot for aircraft having a gyro-magnetic compass including a directional gyroscope normally slaved from a magnetic compass as the normal azimuth reference device for said automatic pilot, means whereby said directional gyroscope may be freed at will from control by the magnetic compass and again brought under control thereof, means for preventing the automatic pilot from causing course changes upon reestablishment of the magnetic compass control of said gyroscope comprising a differential device between the directional gyroscope and automatic pilot, means brought into action by such reestablishment for rotating said device at the same speed that the gyroscope is slaved from the magnetic compass, and means for deenergizing said rotating means after a predetermined period.

4. A gyro-magnetic automatic pilot for aircraft as claimed in claim 3, having means for slaving the directional gyroscope at a greater than normal rate for the period during which synchronism is taking place after reestablishment of magnetic control.

5. In an automatic pilot including a rudder servomotor, a directional gyroscope, a magnetic compass, means for slaving said gyroscope from said compass during gyro-magnetic compass operation, means for freeing said gyroscope from magnetic coercion and reestablishing magnetic control, at will, a pick-off for governing said servomotor normally controlled from said gyroscope, and auxiliary means brought into action upon such reestablishment for preventing false turn signals from being transmitted from said controller during the synchronizing period.

6. A dual azimuth reference for automatic pilots for use in all latitudes comprising a directional gyroscope, a magnetic compass, said automatic pilot being normally under the dual control of said gyroscope and compass, means for severing the control of the automatic pilot from the magnetic compass and reestablishing the same, means responding to such reestablishment for preventing said automatic pilot from causing turning off course, and means for limiting the period of operation of said preventing means.

7. A gyro-magnetic compass adapted for operation in all latitudes, comprising a directional gyroscope, a magnetic compass, means for slaving said gyroscope from said compass during gyro-magnetic compass operation, means for freeing said gyroscope from magnetic coercion and reestablishing magnetic control, at will, auxiliary means brought into action upon such reestablishment for preventing false turn signals from being transmitted from the gyroscope, and means for rendering said auxiliary means only temporarily effective to give said gyroscope time to reach the magnetic meridian.

8. In an automatic pilot for aircraft having a gyro-magnetic compass including a directional gyroscope normally corrected from a magnetic compass as the normal azimuth reference device for said automatic pilot, means for temporarily severing the correction of said gyroscope from said compass and reestablishing such correction, and means for preventing the automatic pilot from causing course changes upon reestablishment of such correction until said gyroscope has been aligned with the magnetic meridian.

9. In an automatic pilot for aircraft having a gyro-magnetic compass including a directional gyroscope normally corrected from a magnetic compass as the normal azimuth reference device for said automatic pilot and further including means for comparing the heading of the craft as determined by said compass with the heading of the aircraft as determined by said gyroscope and for providing a corrective signal proportional to the difference therebetween, and means for normally precessing said gyroscope in accordance with said corrective signal, means whereby said directional gyroscope may be freed at will from control by the magnetic compass and again brought under control thereof, means for preventing said automatic pilot from causing course changes upon reestablishment of the magnetic compass control of said gyroscope comprising a differential device having elements thereof connected with the directional gyroscope and the automatic pilot, motive means connected to drive one of the elements of said differential device, and means including time delay means responsive to said reestablishment for temporarily supplying said corrective signal to said motive means in a sense to drive said differential element at the same speed that the gyroscope is caused to precess by said corrective signal.

References Cited in the file of this patent

UNITED STATES PATENTS

| | | |
|---|---|---|
| 2,416,646 | Rylsky | Feb. 25, 1947 |
| 2,524,756 | Braddon et al. | Oct. 10, 1950 |
| 2,539,411 | Esval et al. | Jan. 30, 1951 |
| 2,561,367 | Haskins | July 24, 1951 |
| 2,590,780 | Lynch | Mar. 25, 1952 |
| 2,686,021 | Halpert | Aug. 10, 1954 |
| 2,726,457 | Konet et al. | Dec. 13, 1955 |